United States Patent [19]

Drabowitch et al.

[11] Patent Number: 4,544,925

[45] Date of Patent: Oct. 1, 1985

[54] ASSEMBLY OF MAIN AND AUXILIARY ELECTRONIC SCANNING ANTENNAS AND RADAR INCORPORATING SUCH AN ASSEMBLY

[75] Inventors: Serge Drabowitch; Guy Leterrier, both of Paris, France

[73] Assignee: Thomson-CSF, Paris, France

[21] Appl. No.: 404,490

[22] Filed: Aug. 2, 1982

[30] Foreign Application Priority Data

Aug. 7, 1981 [FR] France ............................... 81 15362

[51] Int. Cl.[4] ............................................ G01S 7/36

[52] U.S. Cl. .................................. 343/18 E; 343/361; 343/371

[58] Field of Search ..................... 343/18 E, 361, 362, 343/368, 371, 379

[56] References Cited

U.S. PATENT DOCUMENTS 3,209,355 9/1965 Livingston ...................... 343/371 X
3,308,465 3/1967 Tamama .............................. 343/368
3,631,503 12/1971 Tang et al. ...................... 343/371 X
3,987,444 10/1976 Masak et al. ........................ 343/380

*Primary Examiner*—T. H. Tubbesing
*Attorney, Agent, or Firm*—Cushman, Darby & Cushman

[57] ABSTRACT

The invention relates to an assembly of main and auxiliary antennas for an electronic scanning radar. Each auxiliary antenna uses all or part of the elementary radiation sources of the main antenna. The energy received by each of them is sampled by a coupler and then phase shifted by an angle $\phi i$ in an adjustable phase shift circuit. The respective outputs of the phase shift circuits are concentrated within a waveguide. The auxiliary antennas are of the same type as the main antenna. The invention is applicable to radars equipped with an anti-jamming device.

10 Claims, 4 Drawing Figures

FIG_3-b
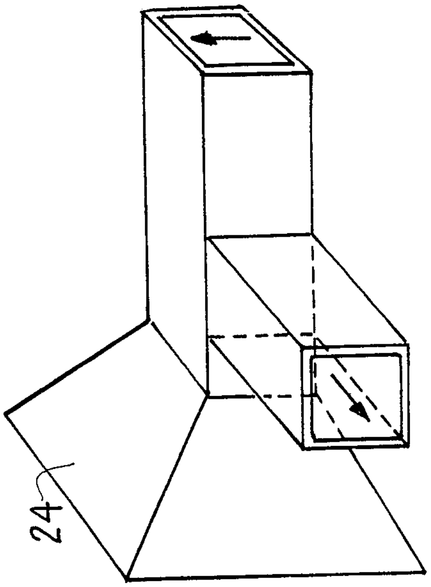
FIG_3-a
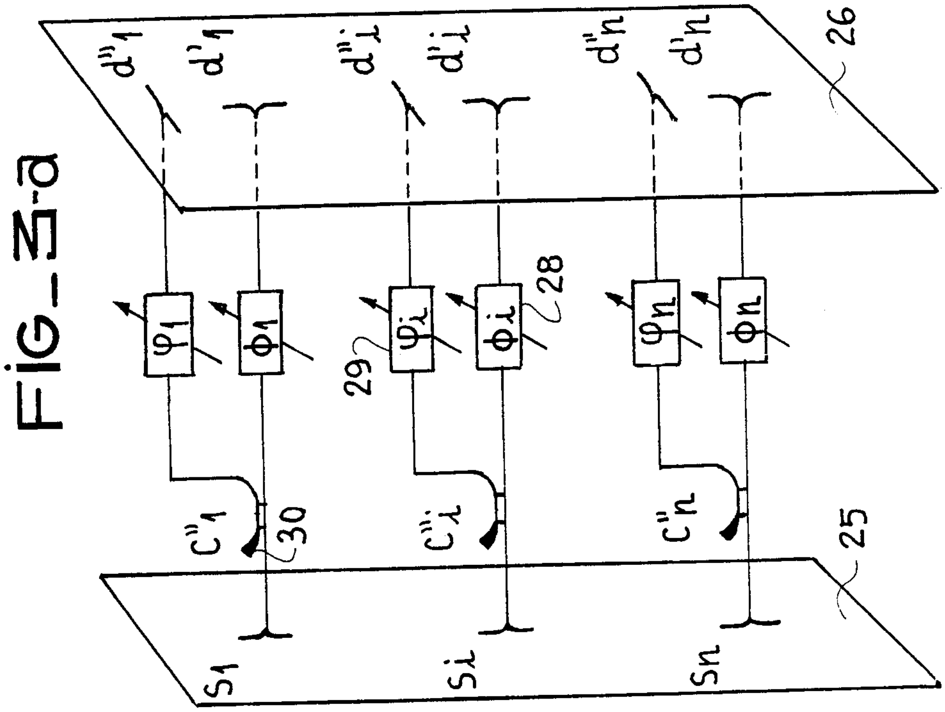

ASSEMBLY OF MAIN AND AUXILIARY ELECTRONIC SCANNING ANTENNAS AND RADAR INCORPORATING SUCH AN ASSEMBLY

BACKGROUND OF THE INVENTION

The present invention relates to an assembly of auxiliary and main electronic scanning antennas and to a radar incorporating such an assembly.

An electronic scanning antenna comprises in per se known manner elementary radiation sources and for each of these a phase shift circuit, whose phase angle can be adjusted by means of a control circuit. The modification of the phase angles changes the pointing direction of the antenna.

When a radar is equipped with an anti-jamming device, in general an adequate number of auxiliary antennas is used to ensure that each of them is pointed in the direction of a jamming station. In this case, the signals from these auxiliary antennas are mixed after their amplitude and phase have been appropriately adapted to those from the main antenna in order to cancel out the signals from the various jamming stations. This solution involves the use of a larger number of auxiliary antennas, which must be equal to the number of jamming stations. Therefore, the cost and overall dimensions of such an electronic scanning antenna assembly are very considerable.

BRIEF SUMMARY OF THE INVENTION

The present invention relates to an assembly of main and auxiliary electronic scanning antennas having reduced overall dimensions.

Another object of the invention is the provision of an assembly of main and auxiliary directive or directional antennas which can be used in association with an anti-jamming device.

According to the invention, the assembly of main and auxiliary antennas for an electronic scanning radar in which the main antenna comprises a group of elementary radiation sources, each associated with an adjustable phase shift circuit, the outputs of said phase shift circuits being focused or regrouped in accordance with a single polarization in order to form a main channel corresponding to the main beam and collected in a waveguide, is characterized in that the beam of each auxiliary antenna is formed by sampling part of the energy received by part or all the elementary sources Sl . . . Si . . . Sn of the main antenna, via a coupler C"l . . . C"i . . . C"n respectively and then phase shifted in an adjustable phase shift circuit 29, the energies at the output of said phase shift circuits 29 being focused or regrouped in accordance with a single polarization so as to form one or more auxiliary channels corresponding to one or more auxiliary beams.

BRIEF DESCRIPTION OF THE DRAWINGS

The invention is described in greater detail hereinafter relative to non-limitative embodiments and the attached drawings, wherein show:

FIGS. 3*a* and 3*b* the simplified view of another embodiment of an assembly according to the invention in which the main antenna is of the lens type.

DETAILED DESCRIPTION OF THE PREFERRED EMBODIMENTS

In the non-limitative embodiments shown in the attached drawings, the same references designate similar elements or elements fulfilling the same functions. In particular, the elementary radiation sources are designated as Sl . . . Si . . . Sn and can be constituted e.g. by radiation members as in FIG. 2, or dipoles as in FIG. 3.

In order to simplify the drawings, only a single auxiliary antenna is shown, because the auxiliary beam is still formed in accordance with the same principles by sampling part of the elementary energy received by means of a coupler.

Figure 1:
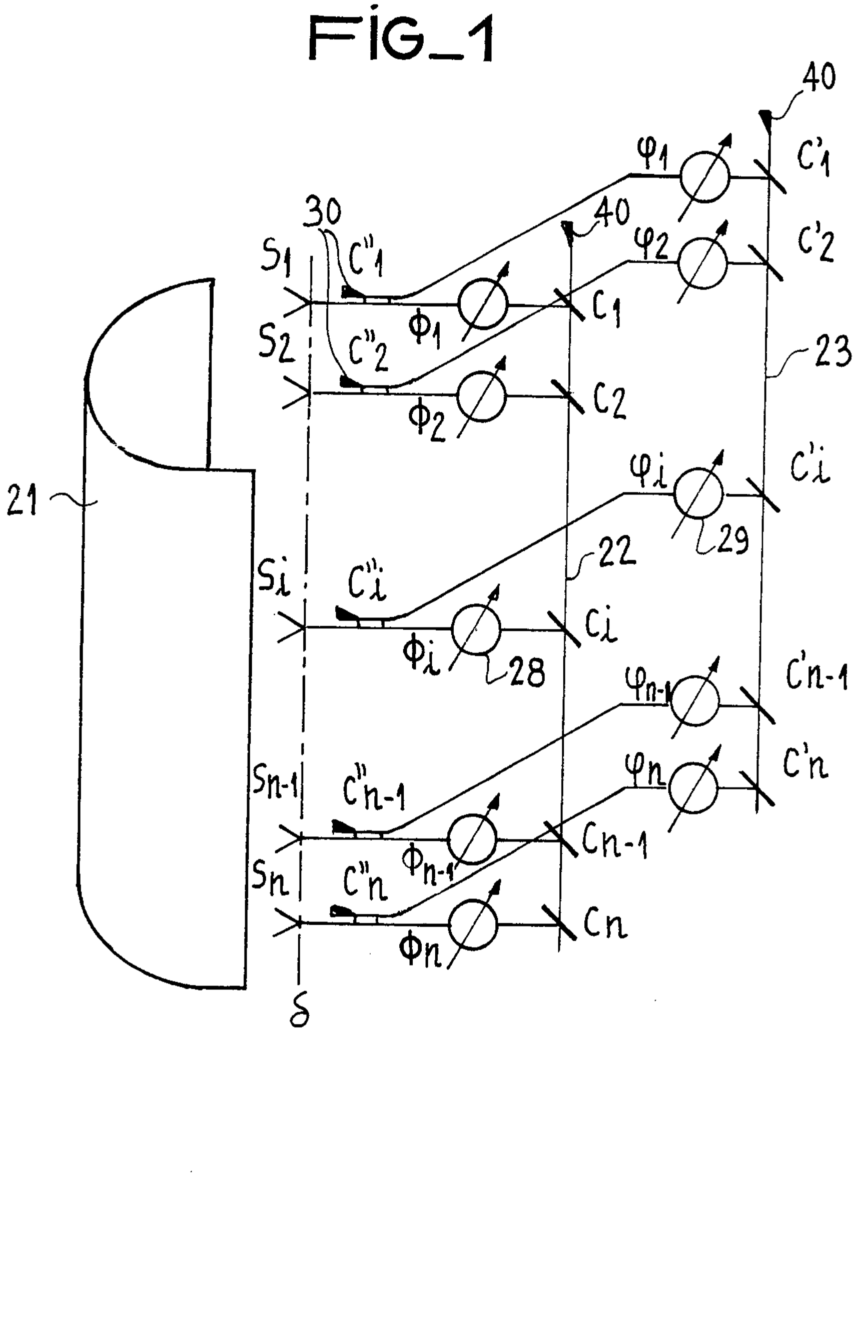
FIG. 1 a simplified view of a non-limitative embodiment of a main antenna/auxiliary antenna assembly according to the invention.

FIG. 1 shows an assembly constituted by a main antenna and an auxiliary antenna according to the invention. The main antenna is an electronic scanning antenna formed by n elementary sources Sl . . . Si . . . Sn located on the focal line $\delta$ of a parabolic directrix cylindrical reflector 21. This allows scanning in elevation (in site). With each of the elementary sources Si is associated an adjustable phase shift circuit 28 of phase shift $\phi$i and a charged (or pressurized) directional coupler Ci. In this embodiment, the auxiliary antenna also comprises n elementary antennas.

The elementary antenna of order i of the auxiliary antenna comprises a phase shift circuit 29, whose phase angle $\phi$i is adjustable and a charged directional coupler C'i. The phase shift circuit 29 of order i is supplied with part of the energy received by the elementary source of the same order Si of the main antenna, said energy being taken, before being phase shifted in circuit 28, by a charged directional coupler C"i positioned between source Si and circuit 28 of phase shift $\phi$i of corresponding order i.

On reception, the energy of the main antenna beam is collected in a charged waveguide 22 to which are connected by means of couplers Ci the elementary assemblies formed in each case by the association of a phase shift circuit 28 and a directional coupler Ci.

In the same way, the energy of the auxiliary antenna beam is collected in a charged waveguide 23 to which are connected by means of couplers C'i the elementary assemblies formed in each case by the association of a directional coupler C"i, a phase shift circuit 29 and a coupler C'i. The charge of the directional couplers Ci, C'i, C"i and waveguides 22, 23 is respectively designated by 30 and 40.

Figure 2:
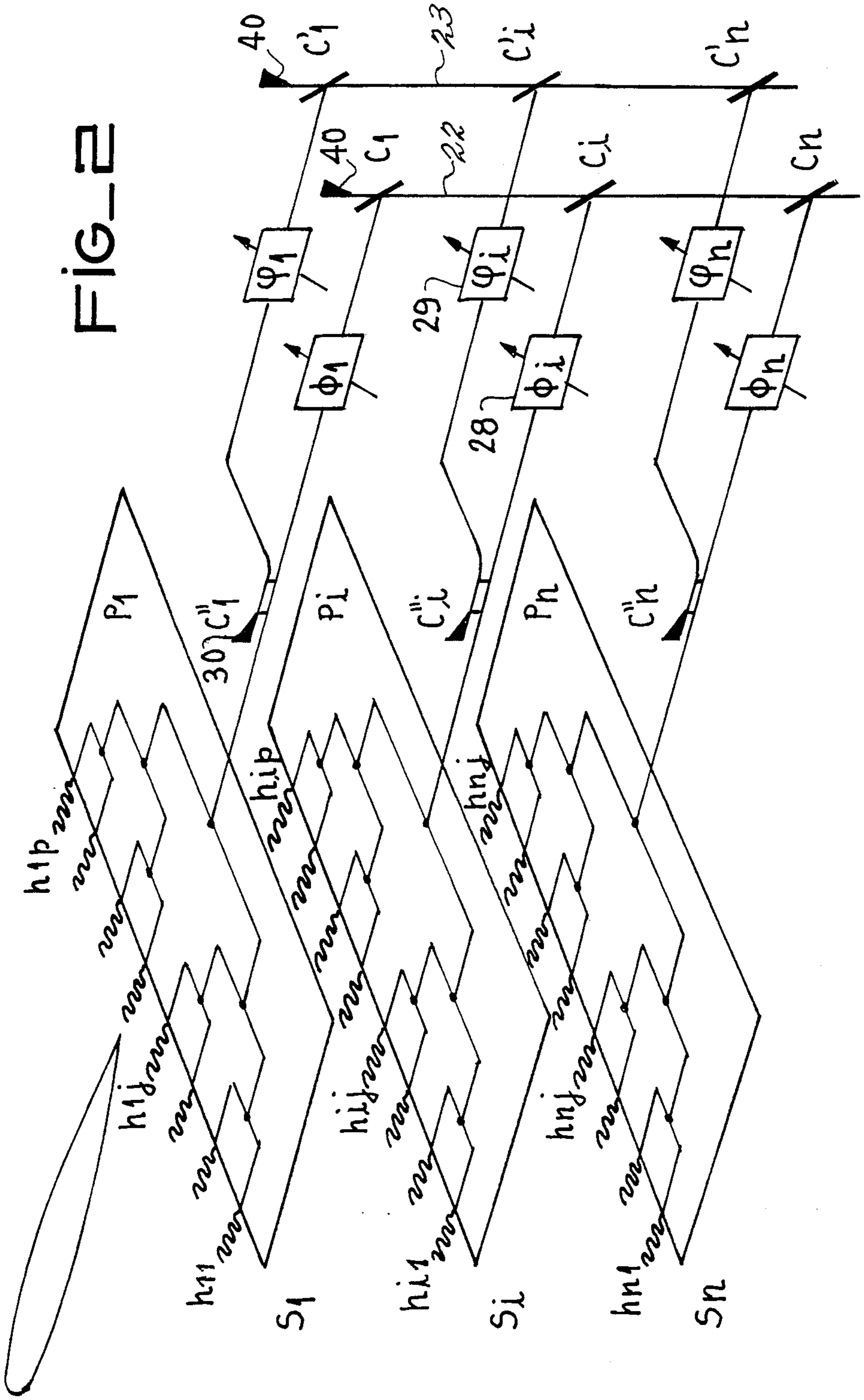
FIG. 2 a variant of the embodiment of FIG. 1.

FIG. 2 shows a variant of the embodiment of FIG. 1.

The electronic scanning antenna of FIG. 2 differs from the embodiment of FIG. 1 in that the elementary sources Sl . . . Si . . . Sn are constituted by a radiating assembly directly ensuring focusing in bearing.

In the variant of FIG. 2, the radiation elements are constituted by p coils $h_{il}$ . . . $h_{ij}$ . . . $h_{ip}$ supplied by a # system of the espalier type by guided division, carried by a radiating beam Pi. There are n parallel beams Pl . . . Pi . . . Pn. As in the case of FIG. 1, a phase shift circuit 28, whose shift $\phi$i is adjustable and a directional coupler Ci charged at 30 are associated with each of the radiation members Pi.

Between circuit 28 of phase shift $\phi$i and elementary source Si constituted by the radiation member Pi carrying p radiating elements $H_{il}$ . . . $h_{ij}$ . . . $h_{ip}$, a directional coupler C"i charged at 30 samples part of the elementary energy received by the main antenna, said sampled elementary energy then being applied to the input of an adjustable phase shift circuit 29, where it undergoes a phase shift $\phi i$ in order to supply, in the manner shown in FIG. 1, a waveguide 23, charged at 40, via a directional coupler C'i charged at 30.

In the same way, the energy of the main antenna beam is, on reception, collected in a waveguide 22, charged at end 40 by means of couplers Ci.

FIG. 3a shows an assembly of antennas of the lens type with the two front 25 and rear 26 faces and incorporating a main antenna and a single auxiliary antenna. The front face 25 carries the elementary radiation sources Si which, in the embodiment of FIG. 3a, are dipoles of the same pôlarization, but which could be of another type, e.g. coils, without passing beyond the scope of the invention.

As in the case of FIGS. 1 and 2, the main antenna comprises for each elementary radiation source Si, a circuit 28 with an adjustable phase shift $\phi i$, located between the front face 25 and the rear face 26 and supplying a dipole d'i positioned on the rear face 26 of the antenna. The n dipoles d'i have the same polarization.

Associated with each elementary source Si, a directional coupler C"i charged at 30 samples part of the energy received by source Si and supplies, via a circuit 29 with an adjustable phase shift $\phi i$, a dipole d"i, which is also positioned on the rear face 26. The n dipoles d"i have the same polarization which is crossed with that of dipoles d'i.

Dipoles d'i and dipoles d"i cover the rear face 26 and radiate the energy received onto a primary collector, whereof an embodiment is shown in FIG. 3b. In the manner illustrated in the latter figure, it can be constituted by a horn 24, which is common to the main antenna and to the auxiliary antenna and which has two outputs radiating in crossed polarization. It can also be constituted by two horns for the main and auxiliary antennas respectively, the primary source of the main antenna being located on the local axis of the structure and that of the auxiliary antenna being defocused with respect to the first-mentioned. The respective outputs of these two primary sources radiate in crossed polarization. The latter embodiment is not shown.

The operation of an assembly constituted by a main antenna and an auxiliary antenna according to the invention used in association with an anti-jamming device is as follows. For each pointing direction (azimuth and elevation) of the main antenna, said direction being determined by the phase shifts $\phi i$ applied by circuits 28, the auxiliary antenna can be pointed in the direction of a jamming station. A calculating circuit then determines the phase shift circuits 28, whose phase $\phi i$ must be modified in order to minimize the gain of the main antenna in the direction of the jamming station.

The phase angle $\phi i$ of circuits 29 is then modified so as to point the auxiliary antenna towards the following jamming station. The aforementioned operation is then repeated in the same way for all the jamming stations for each pointing direction of the main antenna.

Thus, an assembly of main and auxiliary electronic scanning antennas is provided in which the auxiliary antenna uses all or part of the elementary radiation sources of the main antenna.

The present invention is applicable to an electronic scanning radar equipped with an anti-jamming device.

What is claimed is:

1. An antenna for an electronic scanning radar having a main beam and at least one auxiliary beam, comprising:
   - radiation source means for producing a group of outputs;
   - first adjustable phase shift means, connected to said source means, for focussing said outputs in accordance with a single polarization so as to form a main channel corresponding to said main beam;
   - first waveguide means, connected to said first phase shift means, for collecting said main channel and providing a main beam output;
   - directional coupler means, connected between said source means and said first phase shift means, for sampling part of said outputs and producing a sampled output;
   - second adjustable phase shift means, connected to said coupler means, for focussing said sampled outputs in accordance with said single polarization so as to form at least one auxiliary channel corresponding to said at least one auxiliary beam; and
   - second waveguide means, connected to said second phase shift means, for collecting said auxiliary channel and providing auxiliary beam outputs.

2. An antenna according to claim 1 further comprising couplers connected between said first phase shift means and said first waveguide means, and between said second phase shift means and said second waveguide means.

3. An antenna assembly according to claim 2, wherein said radiation source means are aligned with the focal axis of a cylindro-parabolic reflector to form an electronic antenna scanning in elevation, said first and second second waveguides being parallel to said focal axis.

4. An antenna according to claim 2, wherein said radiation source means are parallel radiation members ensuring focusing in elevation and each said member carrying a group of radiation elements directly ensuring focusing in bearing.

5. An antenna assembly according to claim 1, wherein said directional coupler means are charged directional couplers.

6. An antenna according to claim 1 wherein said antenna is of the lens type, having a front face and a rear face between which are disposed said first and said second phase shift means, said radiation source means being disposed on said front face and said rear face including two groups of cross-polarized dipoles, a first group of said dipoles transmitting said main channel and a second group of said dipoles transmitting said auxiliary channel, and primary collector means for receiving said main channel and said auxiliary channel transmissions and transmitting said transmissions to said first and said second waveguide means, respectively.

7. An antenna according to claim 6, wherein said primary collector means is placed on a focal axis of said antenna and is defocused relative to said radiation source means.

8. An antenna according to claim 6, wherein said primary collector means is placed on a focal axis of said antenna and has two outputs in crossed polarization.

9. An antenna according to claim 6, 7 or 8, wherein said primary collector means includes horns.

10. A radar equipped with an electronic scanning antenna according to any one of the claims 3–4, 7, 8, 5, 1, 2, 6, wherein said radar is used in an anti-jamming role.

* * * * *